United States Patent [19]

Marmarelis et al.

[11] Patent Number: 5,760,732
[45] Date of Patent: Jun. 2, 1998

[54] METHOD AND APPARATUS FOR ENHANCED RESOLUTION OF RANGE ESTIMATES IN ECHO LOCATION FOR DETECTION AND IMAGING SYSTEMS

[75] Inventors: Vasilis Z. Marmarelis, Irville; Chrysostomos L. Nikias, Ranch Palos Verdes, both of Calif.; David Sheby, Cherry Hill, N.J.

[73] Assignee: Multispec Corporation, Huntington Beach, Calif.

[21] Appl. No.: 641,346

[22] Filed: May 1, 1996

[51] Int. Cl.[6] .................................................. G01S 13/06
[52] U.S. Cl. .......................... 342/145; 342/162; 342/189; 367/905
[58] Field of Search ............................. 367/100, 905; 342/145, 162, 189, 379, 25

[56] References Cited

U.S. PATENT DOCUMENTS

| | | | |
|---|---|---|---|
| 4,384,291 | 5/1983 | Lewis et al. | 342/196 |
| 4,580,139 | 4/1986 | Weathers et al. | 342/189 |
| 4,933,914 | 6/1990 | Feintuch et al. | 367/87 |
| 5,070,337 | 12/1991 | Chen et al. | 342/201 |

*Primary Examiner*—Ian J. Lobo
*Attorney, Agent, or Firm*—Price, Gess & Ubell

[57] ABSTRACT

A method and apparatus for enhancing resolution of range estimates in all echo location systems and, specifically, such systems as Radar, Sonar, and Synthetic Aperture Radar (SAR), for example. The invention utilizes high order signal processing to "sharpen" or contract the main lobe of the processing system ambiguity function and suppress its side lobes, for a given transmission pulse bandwidth. The method and apparatus may be implemented in the frequency domain or time domain. Enhanced resolution is achieved by using a filter (MSC filter), according to this invention, in the echo location data processing system so that the received echo data is processed by the MSC filter to produce a signal that exhibits enhanced range resolution. The MSC filter output, $H(\omega)$, which is specific to the transmitted pulse waveform, is the ratio of a high-order manipulation of the transmitted signal with its modified spectral profile.

21 Claims, 12 Drawing Sheets

METHOD AND APPARATUS FOR ENHANCED RESOLUTION OF RANGE ESTIMATES IN ECHO LOCATION FOR DETECTION AND IMAGING SYSTEMS

BACKGROUND OF THE INVENTION

1. Field of the Invention

The present invention relates to a method and apparatus for locating reflecting objects by transmitting energy to the reflected object, receiving signals reflected from it, and processing the received signals to determine the distance or range to the object and, more particularly, pertains to a new and improved method and apparatus for providing more accurate range estimates of object locations and enhancing the ability to resolve closely spaced reflecting objects or reflecting parts of the same object (range resolution).

2. Description of Related Art

Echo location systems characteristically utilize signals reflected from an object to determine the distance to that object (range). One such system is Radar. In a Radar system, a series of accurately timed electromagnetic pulses of radio frequency are transmitted by a directional antenna. When these radio frequency electromagnetic signals strike a conducting object, energy is reflected. The reflected energy is picked up by the Radar receiving antenna. The time between the transmission of a signal and its return to the receiver gives an estimate of the distance between transmitter and reflector (half of the travel time multiplied by the speed of propagation—assuming the latter is constant), termed "the range."

The processing of reflected signals to provide accurate range estimates in a variety of environments, possibly in the presence of noise, clutter, or interference, has been an area of considerable effort in the design of Radar systems. This becomes particularly important when one seeks to resolve closely spaced reflecting objects or reflecting parts of the same object (range resolution). The net effect of improving "range resolution" is an enhancement of spatial resolution in detecting or imaging the reflecting objects.

Other echo location systems such as Sonar (sound navigation and ranging) utilize sonic or supersonic pressure waves instead of electromagnetic waves to detect objects. Sonar systems also have a need for accurate range estimation and enhanced range resolution in a variety of environments, e.g., underwater (marine exploration), in soil (seismic exploration) or in tissue (medical ultrasound). Similar needs and operational requirements exist for telemetric signals that employ microwave and laser pulses, including laser radar systems.

In order to enhance the imaging capability of Radar systems, synthetic aperture Radar (SAR) was developed. SAR is a Radar system that synthesizes the effect of a long antenna by combining successive measurements of the reflected Radar signals using a moving (short) antenna and appropriate signal processing. SAR systems may operate in any radar band as needed to provide the desired high resolution imaging. The SAR system is typically mounted on a moving platform (including, but not limited to, aircraft, satellites, and unmanned aerial vehicles). High resolution along the track of movement, or azimuth direction, is achieved through processing of the return signals at successive azimuth positions of the moving platform. High resolution in the traverse direction, i.e., the range, is typically achieved by matched filtering of wideband pulse waveforms (often termed "pulse compression"). Pulse compression (matched filtering) is also used in Radar or Sonar systems for range estimation. The counterpart of SAR in the Sonar context is the synthetic aperture Sonar (SAS), where similar principles, methods, and requirements exist.

The SAR systems, presently in use evolved in response to a pressing need for higher resolution in airborne imaging applications where the range and wavelength values led to excessive requirements for the physical size of the airborne antenna (real aperture). By using a small moving antenna, the SAR system emulates a long aperture by combining successive return signals to achieve the resolution of a focussed array system, thus obviating the need for a large physical antenna. In order to achieve high range resolution, as well as to maintain high signal-to-noise ratio (SNR), these prior art systems use pulse compression techniques that employ broadband Radar pulse waveforms (for example linear FM or chirp signals) in connection with matched filtering. The range resolution achievable by these pulse compression (matched filtering) techniques is inversely proportional to the transmitted pulse bandwidth. Thus, in order to obtain even greater range resolution, these prior art systems must increase the bandwidth in the transmitted pulse. Increasing the bandwidth of the transmitted pulse, however, is often limited by operational, technical, and regulatory constraints, as well as undesirable side effects, such as causing unintentional RF interference with other systems. Furthermore, the presence of severe noise, clutter, interference or jamming in the operating environment may still significantly degrade the resolution of Radar or SAR systems. Therefore, a pressing need exists for enhancing range resolution in the presence of noise, clutter, interference, or jamming without extending the operational bandwidth of the Radar or SAR system.

The range resolution of conventional Radar signal processing is governed by the matched filtering (pulse compression) operation and its associated ambiguity function. If p(t) is the Radar transmitted signal and r (t) is the return signal at the Radar receiver, then the two signals are related by:

$$r(t) = p(t) \star f(t) + n(t) \tag{1}$$

where "$\star$" denotes the linear convolution operation, f(t) is the reflectivity function expressed in range-equivalent time (t=2 $\chi$/c), where $\chi$ is the range and c is the speed of light) and n(t) is the additive noise/clutter/interference/jamming component taking the form of a random process for modeling purposes. The goal is the accurate estimation of f(t) from digitized data of the signals p(t) and r(t). Note that a common type of stochastic distortion of the f(t) estimate is the so-called "clutter," which can be modeled as signal-dependent noise.

The conventional "matched filtering" or "pulse compression" techniques yield estimates of the reflectivity function f(t) as:

$$\hat{f}(t) = r(t) \star p^*(-t) \tag{2}$$
$$= f(t) \star p(t) \star p^*(-t) + n(t) \star p^*(-t)$$
$$= f(t) \star (g(t) + \epsilon(t))$$

where the matched filter p*(−t) is the time-reversed complex conjugate of the Radar transmitted pulse signal p(t), and g(t) is the autocorrelation of the Radar pulse p(t), equivalent to the convolution:

$$g(t) = p(t) \star p^*(-t) \tag{3}$$

and $\epsilon(t)$ is the cross-correlation between n(t) and p(t). The function g(t) is called the "range ambiguity function"

because its shape determines the range resolution in this case. The range ambiguity function is like the "point-spread function" of optical systems.

Figure 6:
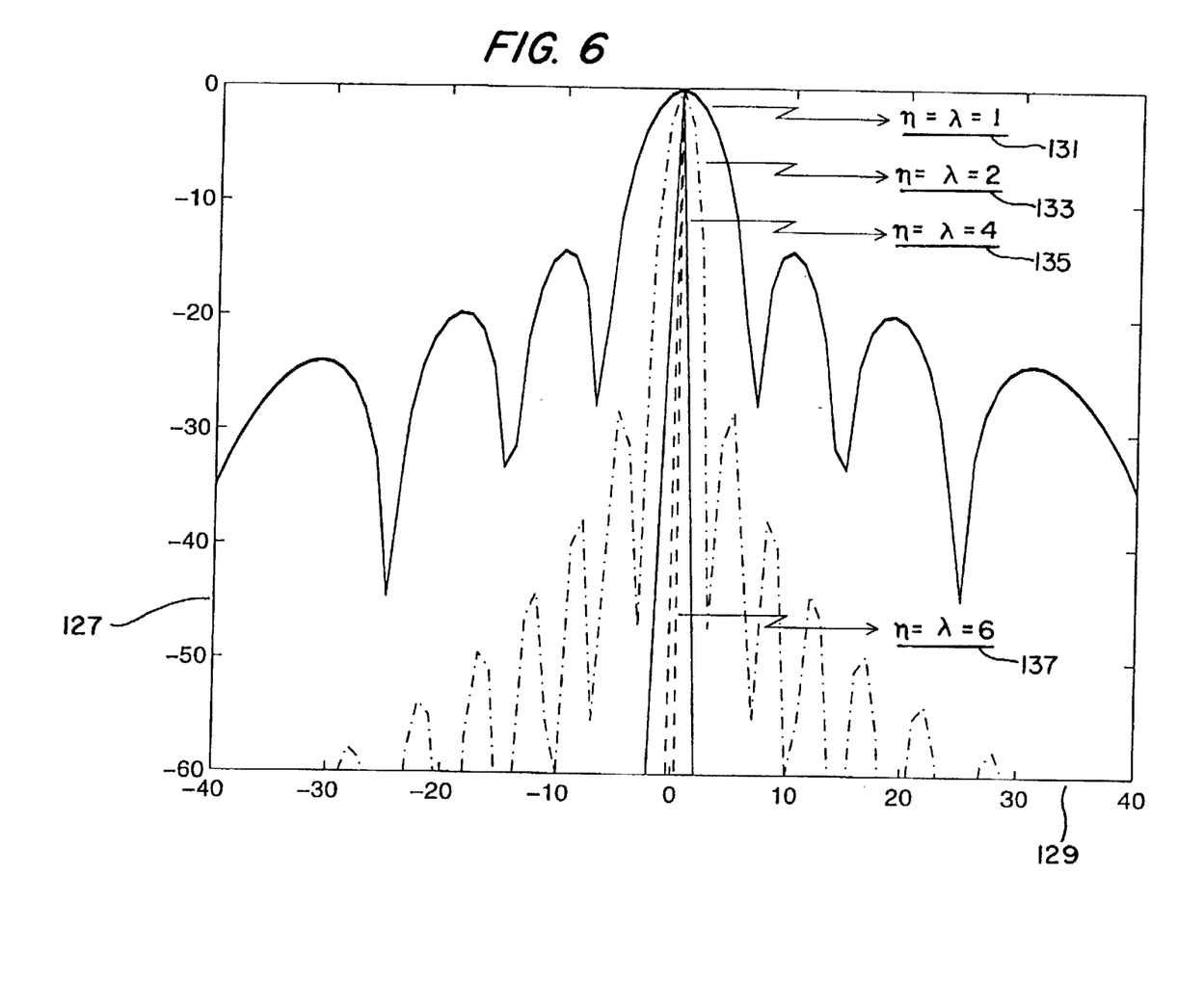
FIG. 6 is a set of range ambiguity functions showing changes to the main and side lobes as the result of data processing by the present invention.

An example of a range ambiguity function for a linear-FM pulse is shown in FIG. 6, in solid line. The resolving capability of the conventional matched filtering operation is determined by the form of the range ambiguity function (or autocorrelation function) of the transmitted Radar pulse and particularly the width of its main lobe. This width (defined conventionally at 3 dB below peak value) determines the extent to which the range estimate of a point scatterer gets smeared by the matched filtering estimation process. The width of the main lobe decreases with increasing Radar pulse bandwidth. Thus, the widely-held view that range estimation enhancement is only possible by increasing the pulse bandwidth.

In the presence of the random process n(t) (Equation (1)), the conventional matched filtering described in Equation (2) yields a maximum output SNR, as long as n(t) is white, and independent of the transmitted pulse p (t). However, in the real world of Radar and SAR imaging, many complicating factors exist that violate these assumptions and may cause inaccurate range estimates. Consider, for instance, the potential problem of clutter, which is likely to manifest itself in many applications where the Radar pulse propagation is subject to significant backscattering on numerous randomly dispersed natural reflectors (e.g., foliage and ground penetration). Clutter represents a stochastic component in n(t) that depends on p(t) and is often non-white and non-Gaussian and, therefore, does not satisfy the assumptions for optimality of matched filtering in range estimation.

To improve resolution, the prior art can only increase the bandwidth of the transmitted pulse. The present invention, on the other hand, achieves enhanced resolution strictly through additional processing of the data, without increasing the bandwidth of the transmitted pulse; while at the same time, it remains computationally efficient and maintains robust performance in the presence of noise, clutter, interference, and/or jamming.

OBJECTS AND SUMMARY OF THE INVENTION

It is an object of this invention to provide a method and apparatus for processing reflected data to obtain enhanced resolution of range estimates without increasing the bandwidth of the transmitted pulse. This object and the general purpose of this invention is accomplished by providing a method and apparatus that utilizes high-order signal processing of the transmitted signals to contract the main lobe and suppress the side lobes of the range ambiguity function for a given pulse bandwidth. The invention may be implemented in the frequency domain or time domain. Enhanced range resolution is obtained by use of a filter (MSC filter) that processes the pulse compressed data to yield the enhanced resolution range estimates. The MSC filter generates a ratio, $H(\omega)$, of a high-order manipulation of the transmitted signal with its modified spectral profile. The form of the resulting MSC filter depends on the transmitted pulse waveform, the sampling frequency and the selected order of the reduced high-order spectrum. The high-order manipulation allows manipulation of two integer parameters to optimize the MSC filter for a given transmitted pulse waveform and its environment, such as noise, clutter, interference, and jamming.

BRIEF DESCRIPTION OF THE DRAWINGS

Other objects and many of the attendant advantages of this invention will be readily appreciated as the same becomes better understood by reference to the following detailed description when considered in conjunction with the accompanying drawings, in which like reference numerals designate like parts throughout the figures thereof, and wherein.

DETAILED DESCRIPTION OF THE PREFERRED EMBODIMENTS

The following description is provided to enable any person skilled in the art to make and use the invention, and sets forth the best modes contemplated by the inventors of carrying out their invention. Various modifications, however, will remain readily apparent to those skilled in the art, since the generic principles of the present invention have been defined herein specifically to provide a method and apparatus for processing reflected data in an echo location system to obtain enhanced range resolution without increasing the bandwidth of the transmitted pulse signal and without significant additional computational burden.

The principle that the larger the bandwidth of the transmitted pulse p(t), the smaller the width (3 dB below peak values) of the main lobe of the range ambiguity function and, consequently, the higher the range resolution of a Radar or a SAR system, applies to all echo location systems regardless of frequency band of operation and regardless of the kind of energy transmitted, i.e., electromagnetic signals, acoustic signals, etc. The present invention, instead of expanding the bandwidth of the transmitted signal, however, enhances range resolution by signal processing, which contracts (i.e., sharpens or narrows) the main lobe and suppresses the side lobes of the range ambiguity function for any given Radar or SAR system. Potential enhancements are greater when the sampling frequency extends beyond the bandwidth of the transmitted signal at baseband. The resulting resolution enhancement is thus achieved strictly through processing of the data without increasing the physical bandwidth of the transmitted pulse.

The approach of the present invention runs contrary to the established view within the Radar community and the SAR community that higher range resolution can only be obtained by transmitting higher bandwidth pulse waveforms. The present invention obtains higher range resolution and, consequently, higher-resolution SAR imagery without extending the bandwidth of the transmitted pulse and, moreover, can be implemented by a simple upgrade on existing Radar and SAR systems.

Figure 1:
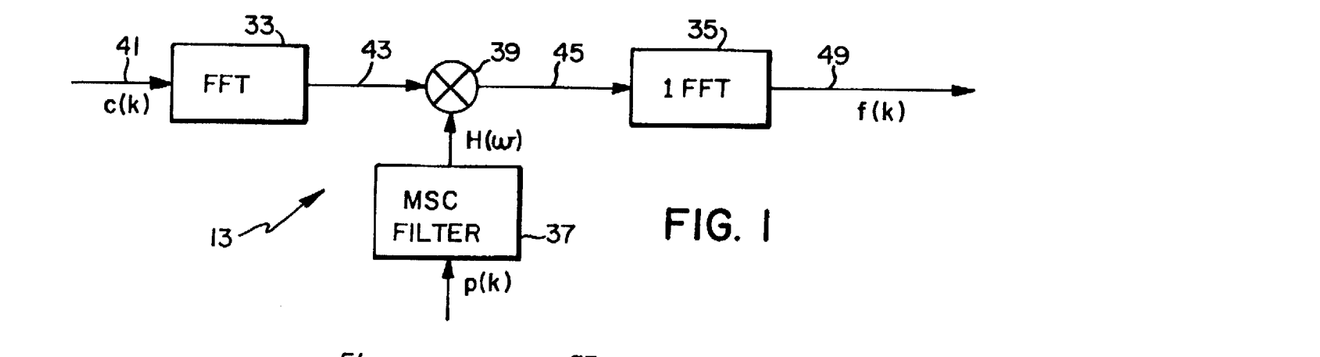
FIG. 1 is a block diagram of a preferred embodiment of the present invention in a range processing module.

The basic implementation of the present invention for range processing in any echo location system is shown in FIG. 1. The implementation of FIG. 1 shows digitized pulse compressed data c(k) supplied on line 41 to a Fast Fourier Transform (FFT) operator 33 which produces the FFT, $C(\omega)$ of the data c(k) and supplies it over line 43 to a multiplier 39. MSC filter 37 generates a compensation factor $H(\omega)$ and supplies it over line 47 to the multiplier 39. The output of multiplier 39 is the product $H(\omega)C(\omega)$ which is supplied over line 45 to Inverse FFT (IFFT) operator 35, which produces the range estimates of the reflectivity function f(k) on line 49 for Radar display, or azimuth processing in SAR imaging. The f(k) range estimates, generated by the embodiment of FIG. 1, contain the information used by Radar, Sonar, and SAR systems, as well as other echo location or imaging systems. The FFT and IFFT operators, as well as the multiplication operation, are all well known in the art. The MSC filter operation 37 is unique, however, and will now be explained in connection with FIG. 2.

Figure 2:
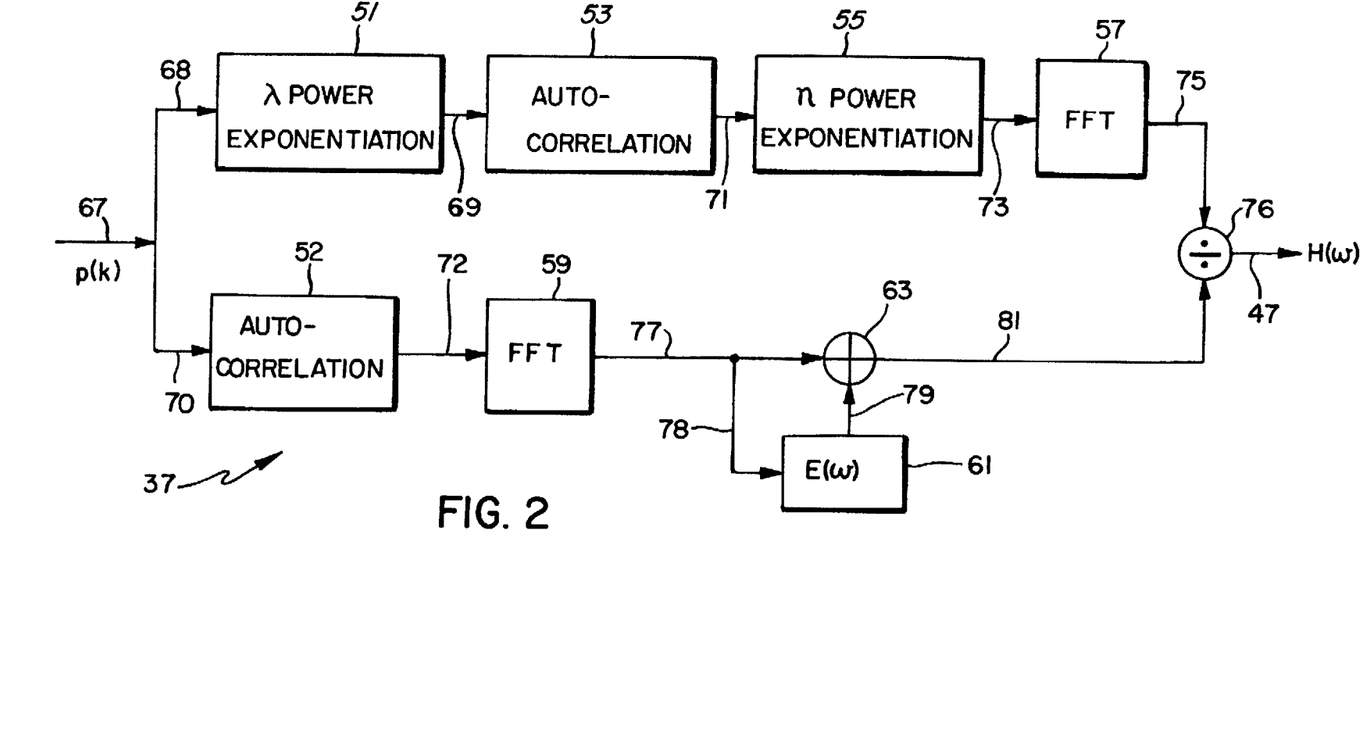
FIG. 2 is a block diagram of a preferred embodiment of the MSC filter according to the present invention.

The input to MSC filter 37 is the digitized transmitted pulse signal p(k) provided to the MSC filter on line 67. The p(k) data is supplied to a λ power exponentiator 51 and to an autocorrelator 52 over two parallel lines 68 and 70, respectively.

The λ power exponentiator 51 raises the pulse signal p (k) received over line 68 to the λ power, generating $p^\lambda(k)$, and supplies it to an autocorrelator 53 on line 69. Autocorrelator 53 generates $q_\lambda(m)$ at output 71, which is supplied to η power exponentiator 55. Exponentiator 55 raises $q_\lambda(m)$ to the power η, generating $q^\eta_\lambda(m)$. The $q^\eta_\lambda(m)$ is supplied to the FFT operator 57 on line 73, which generates $HOS^{(\eta,\lambda)}(\omega)$ on output line 75. The latter is a reduced (integrated) high-order spectrum of order (2λη) for the transmitted pulse p (k). The MSC filter thus performs a form of high-order signal processing (HOSP). For more information on higher-order signal processing generally, see Chrysostomos L. Nikias and Athina P. Petropulu, *Higher-Order Spectral Analysis: a Nonlinear Signal Processing Framework*, Prentice-Hall, 1993, Englewood Cliffs, N.J.

Line 70 supplies the transmitted pulse signal p(k) to the autocorrelator 52. Its output is supplied on line 72 to the FFT operator 59. The output of FFT operator 59, $|P(\omega)|^2$, is supplied on line 77 to a summation operator 63, and on line 78 to a function generator 61. The summation operator 63 adds $|P(\omega)|^2$ to the function $\epsilon(\omega)$. The function $\epsilon(\omega)$ is generated by function generator 61 by taking a very small positive value, equal to the difference of this value minus $|P(\omega)|^2$ whenever $|P(\omega)|^2$ is below this value, and zero elsewhere. The result of the summation at 63 is supplied through line 81 to a divider 76, which computes the ratio: $HOS^{(\eta\lambda)}(\omega)/[|P(\omega)|^2+\epsilon(\omega)]$, which is the compensating factor $H(\omega)$ of the MSC filter delivered on line 47.

The operation of the apparatus and the method of the invention as described in connection with FIGS. 1 and 2 relates to any echo location system. We will now describe how the present invention can be utilized to enhance range resolution in Radar and SAR systems.

Figure 3:
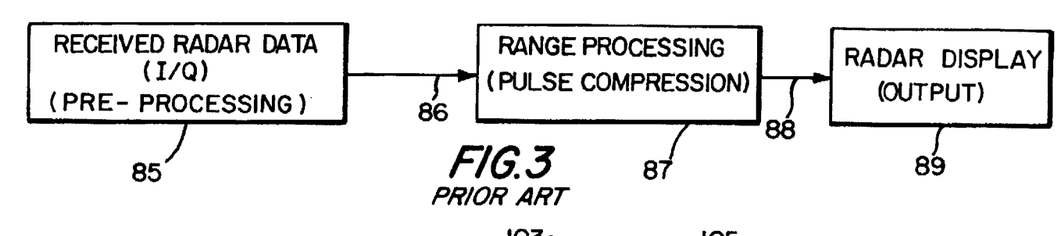
FIG. 3 is a block diagram showing a prior art Radar processing system.
Figure 4:
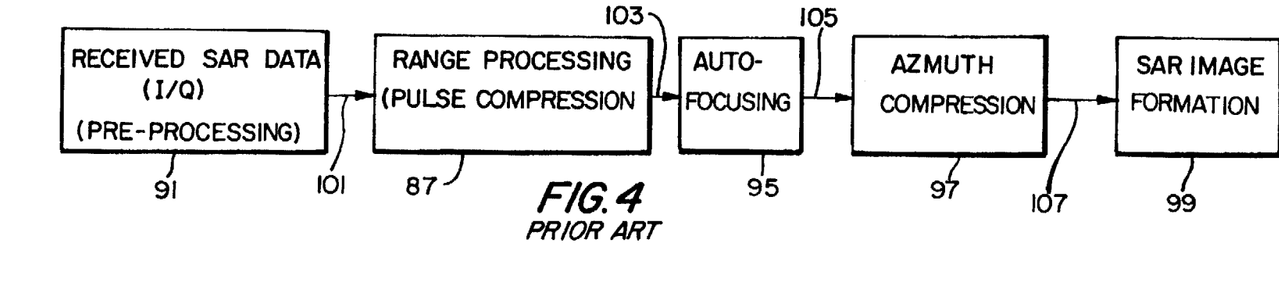
FIG. 4 is a block diagram showing a prior art SAR processing system.

FIGS. 3 and 4 are block diagrams of a typical Radar and a typical SAR processing system, respectively, wherein raw data, usually both in-phase (I) and quadrature (Q), are received. The Radar and SAR data are received and preprocessed in blocks 85 and 91, respectively, according to typical procedures which may include, for example, I/Q demodulation, sampling and digitization, and corrections for possible measurement errors or distortions. The preprocessed raw I and Q data is supplied to the range processing operator 87, where the range estimates are typically generated by matched filtering (pulse compression). For Radar, the generated range estimates on line 88 are supplied to the Radar video display 89 or other interface for decision making. For SAR, the generated range estimates on line 103 are supplied to an autofocusing unit 95. After the autofocusing processing stage, the processed data is passed on line 105 to an azimuth compression unit 97, and thereafter to a SAR image formation and display unit 99.

Figure 5:
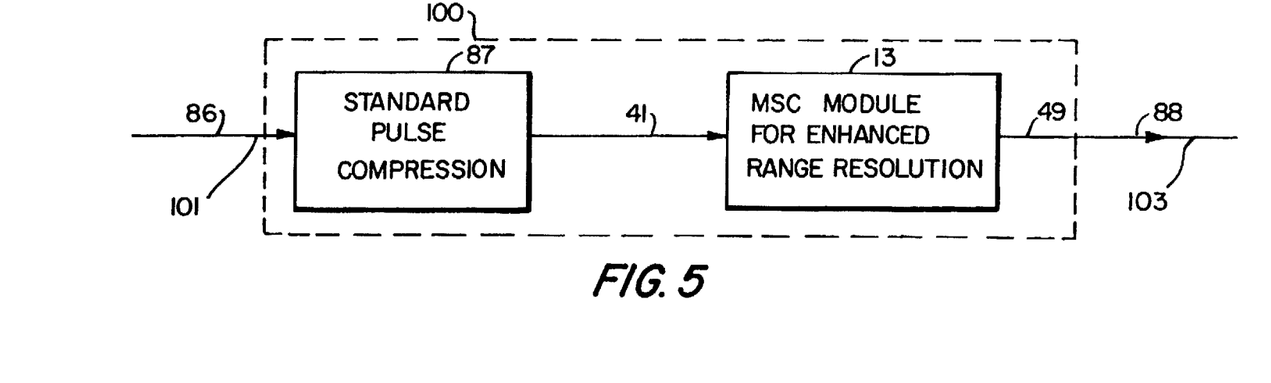
FIG. 5 is a block diagram showing application of the module of FIG. 1 to the range processing section of a Radar or SAR processing systems of FIGS. 3 or 4, respectively.

FIG. 5 illustrates how the MSC filter 37 of the present invention (as a component of the MSC module 13 of FIG. 1) upgrades the range processing module 87 of the typical Radar and SAR systems shown in FIGS. 3 and 4. FIG. 5 shows the MSC filter module 13 as a component of the range processing section 100. The MSC module 13 receives the pulse compressed data from pulse compression unit 87 and generates the range estimates on line 49, which coincides with line 88 and line 103 for the Radar or SAR system of FIGS. 3 and 4, respectively.

The filter processors of the present invention may be used with equal effect in systems that receive raw phase history data, or perform pulse compression in the analog domain, even though the preferred MSC filter embodiment 37 is implemented in the digital domain with pulse compression data. When raw phase history data is received, pulse compression is applied in combination with the MSC filter by multiplying the MSC output with p★ω prior to its application to the raw data. When pulse compression is in the analog domain, an analog-to-digital converter is used to digitize the analog pulse compressed signals prior to processing with the MSC module 13.

The class of MSC filters described and shown in FIG. 2 afford considerable flexibility in selecting the two parameters ($\lambda$ and $\eta$) from among positive integers for optimization purposes in specific environments of noise, interference, jamming, or clutter. For $\eta>1$ and $\lambda>1$, the MSC filters sharpen the range ambiguity function in two simultaneous ways, first by bringing the zero-crossings to the main lobe closer to each other ($\lambda$ effect) and, second, by suppressing the side-lobes while sharpening the main lobe ($\eta$ effect).

Illustrative examples of the range ambiguity functions for a linear-FM transmitted pulse, using the present invention for various $\eta$ and $\lambda$ parameters are shown in FIG. 6. The X-axis 129 represents range, and the Y-axis 127 represents amplitude in dB. When $\eta$ and $\lambda$ are both set equal to 1, the resultant ambiguity function 131 is the one obtained by conventional (standard) pulse compression alone. Setting the parameters $\eta$ and $\lambda$ equal to 2 considerably contracts the main lobe 133 and suppresses the side lobes, as well. Increasing the parameters $\eta$ and $\lambda$ to 4 produces a still sharper contraction of the main lobe 135 and a suppression of the side lobes to where they are no longer discernible. Increasing the variables $\eta$ and $\lambda$ further to 6 produces an ambiguity function with a main lobe 137 that is pencil sharp and has negligible side lobes. The demonstrated contraction of the main lobe and suppression of the side lobes of the range ambiguity functions of FIG. 6 results in considerably enhanced resolution of range estimates (and consequently spatial resolution) in actual Radar or SAR systems. The extent of this enhancement depends on the relation between sampling frequency and the pulse bandwidth, and becomes more pronounced as the sampling frequency extends beyond the pulse bandwidth.

The examples that follow relate to Radar and SAR systems, but it should be kept in mind that the same process would produce the same result of range resolution enhancement in any echo-location or imaging system.

Figure 7:
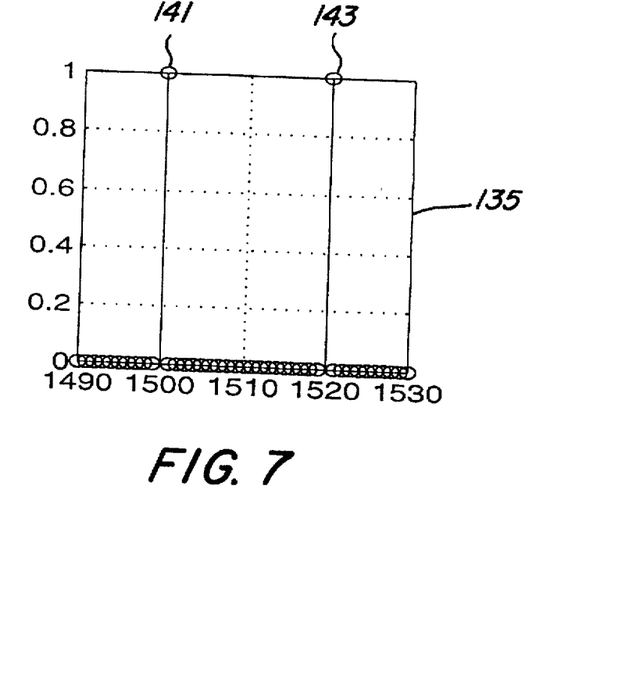
FIG. 7 is a graphical illustration of two reflecting point targets of equal magnitude, separated by 20 range units.
Figure 8:
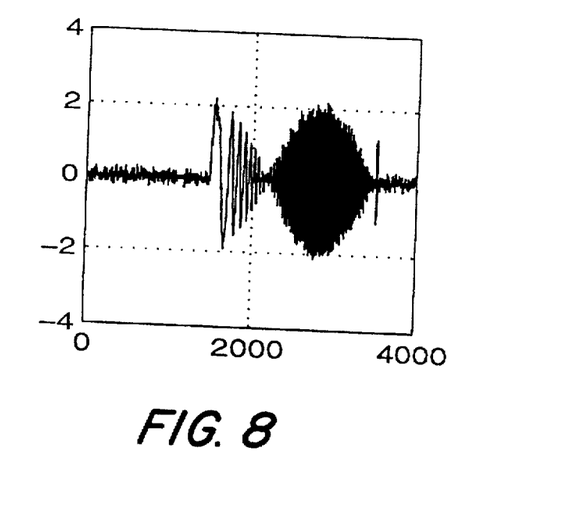
FIG. 8 is the real (in-phase) part of the return signal at the Radar receiver for the two point targets of FIG. 7.
Figure 9:
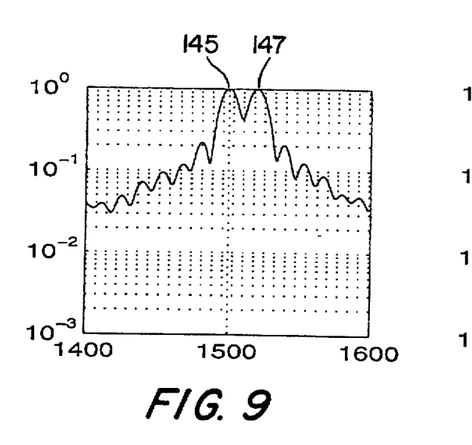
FIG. 9 is the obtained range estimates for the two point targets of FIG. 7 based on standard pulse compression techniques.
Figure 10:
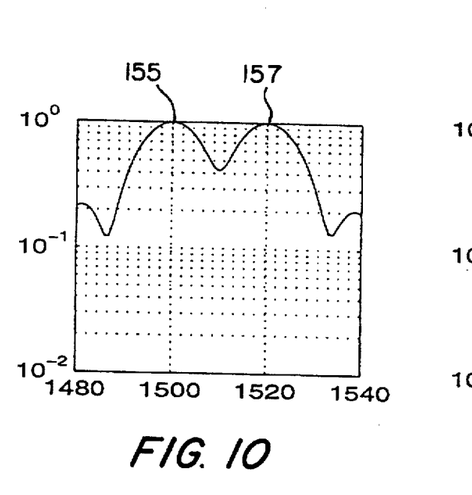
FIG. 10 is an expanded view of FIG. 9.

FIG. 7 illustrates a target model 135 having two point targets, 141 and 143, which are of equal strength and at ranges 1500 and 1520, respectively. The transmitted waveform was chosen to be a linear-FM pulse with a bandwidth of 0.24 relative to a sampling frequency of 0.50. FIG. 8 shows the real (in-phase) part of the reflected signal from the two point targets of FIG. 7 for SNR=20 dB. FIG. 9 illustrates the range estimates resulting from standard pulse compression processing, showing the location of the two point targets identified by the peaks of the main lobes 145 and 147. FIG. 10 is an expanded view of FIG. 9, showing the peaks of the main lobes 155 and 157 located at the correct ranges of 1500 and 1520, respectively, although the resolution between the two point targets is somewhat blunted by the range ambiguity function of pulse compression.

Figure 11:
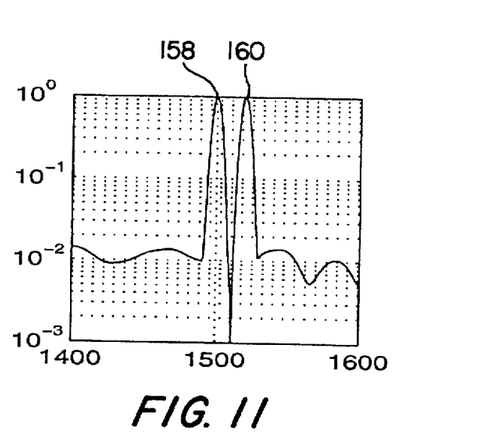
FIG. 11 is the obtained range estimates for the targets of FIG. 7, utilizing the present invention.
Figure 12:
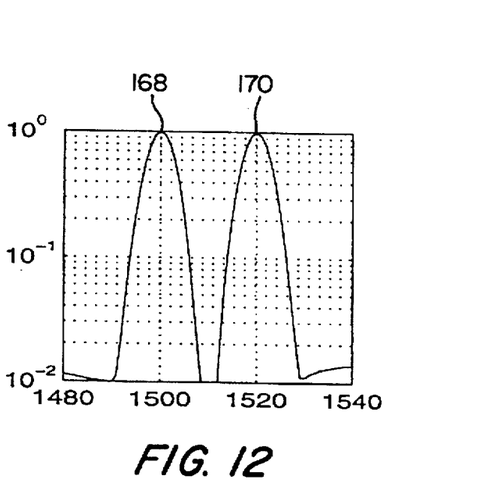
FIG. 12 is an expanded view of FIG. 11.

FIG. 11, on the other hand, shows the range estimates generated by the MSC filter of the present invention, utilizing the same data, with the two parameters set to $\eta=2$, $\lambda=1$. As can be seen in FIG. 11, the two main lobes 158 and 160 are much more clearly defined and the side lobes are considerably more suppressed than in FIG. 9. The expanded view in FIG. 12 shows the locations of the peaks of the two main lobes 168 and 170, correctly identifying the point targets. The latter are highly distinguishable, and with much lower side lobes than their counterparts of FIG. 10 obtained by conventional pulse compression processing, owing to the improved ambiguity function associated with the MSC filter processing.

Figure 13:
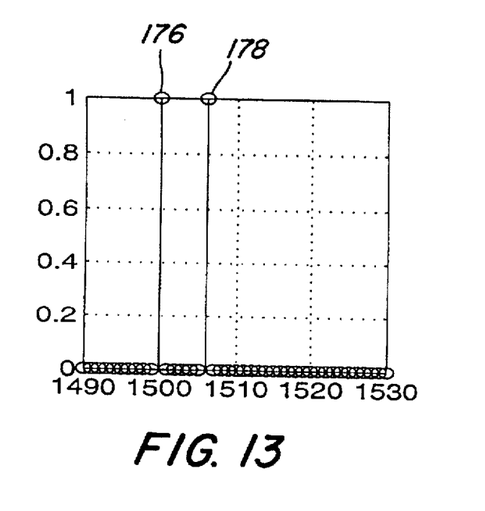
FIG. 13 is another illustration of two reflecting point targets separated by 5 range units.
Figure 14:
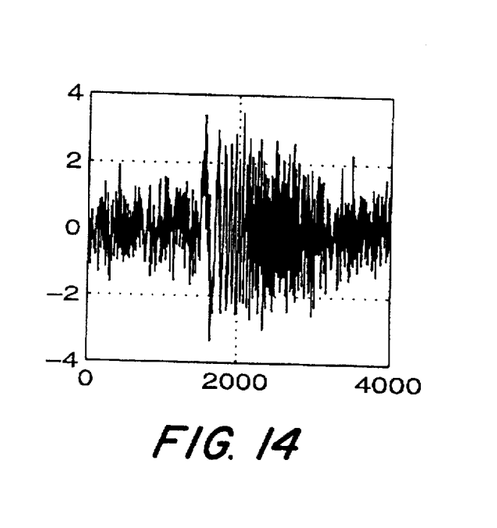
FIG. 14 is an illustration of the real (in-phase) part of the return signal at the Radar receiver for the targets of FIG. 13.
Figure 15:
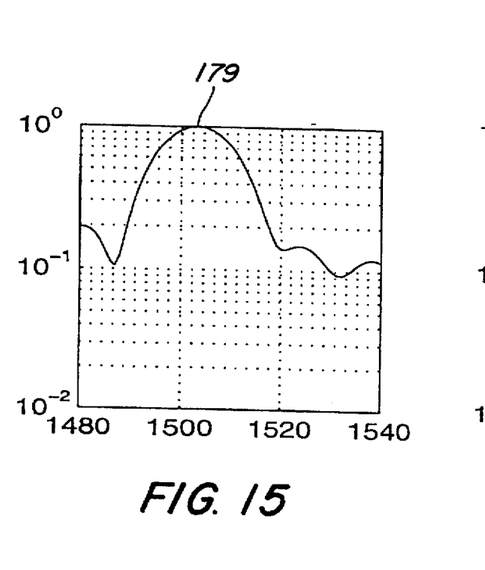
FIG. 15 is the obtained range estimates of the two closely spaced targets of FIG. 13, based on standard pulse compression techniques.

A more challenging example, where the point targets are spaced much more closely together and the SNR is lower is shown in FIG. 13. The point targets having the same magnitude are located at ranges of 1500 and 1506 (separation of 6 range units instead of the 20-unit separation of the previous example). The same pulse waveform but a lower SNR of 5 dB were used in this example. The real (in-phase) part of the received signal is shown in FIG. 14. FIG. 15 shows the output of standard processing utilizing pulse compression where the range estimates of the two point targets are merged into a single main lobe 179, thus failing to resolve the two point targets 176 and 178 of FIG. 13. Conventional thinking would dictate the use of a broader bandwidth for the transmitted pulse in order to contract the main lobe of the associated ambiguity function and, thus, distinguish between the two point targets 176 and 178 of FIG. 15.

Figure 16:
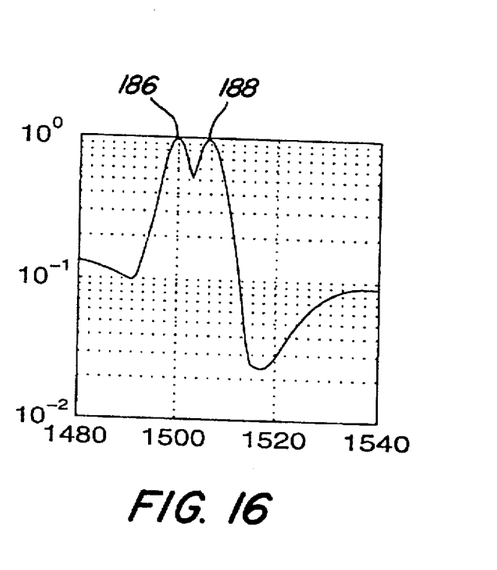
FIG. 16 is the obtained range estimates of the two closely spaced targets of FIG. 13, utilizing the present invention.

However, with the utilization of the MSC filter, where the parameter $\eta$ was set to 2 and $\lambda$ was set to 1, the generated range estimates (FIG. 16) showed two distinct lobes, 186 and 188, with clearly identifiable peak locations that correctly mark the locations at the two closely-spaced point targets. This is accomplished without extending the physical bandwidth of the transmitted pulse and strictly through processing of the pulse compressed data that is computationally feasible in a real-time context.

Figure 17:
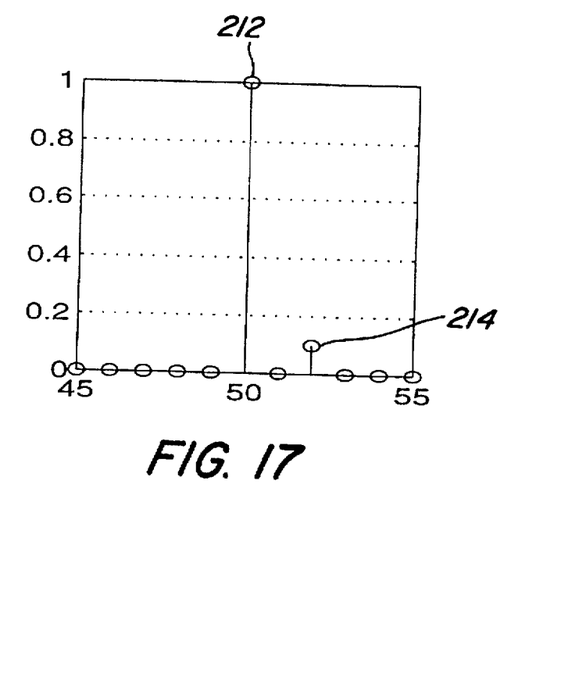
FIG. 17 is another illustration of two reflecting point targets of unequal magnitude, separated by only 2 range units.
Figure 18:
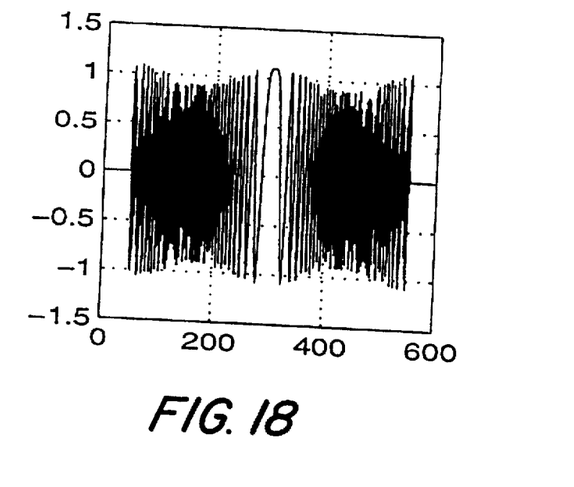
FIG. 18 is an illustration of the real (in-phase) part of the return signal at the Radar receiver for the targets of FIG. 17.
Figure 19:
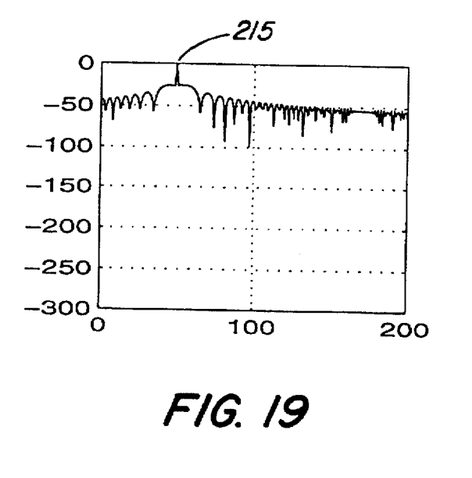
FIG. 19 is an illustration of the obtained range estimates for the targets of FIG. 17, based on standard pulse compression techniques.
Figure 20:
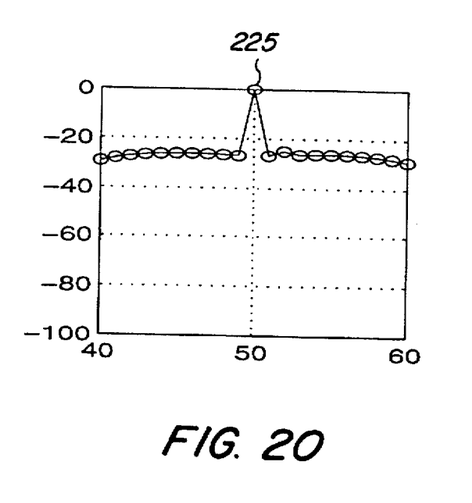
FIG. 20 is an expanded view of FIG. 19.

Referring now to FIG. 17 for another example of the resolution capabilities of the MSC filters according to the invention, two point targets, 212 and 214, are shown that are very closely spaced in range (2-unit separation) and are dissimilar in signal magnitude, 214 having $\frac{1}{10}$ of the signal magnitude of 212. The real (in-phase) part of the return echo signal from those two point targets, for the same transmitted pulse as before, is shown in FIG. 18. Standard pulse compression produced the range estimates shown in FIG. 19, with a single discernible main lobe 215 centered at the location of the large target, thus demonstrating that the small target has been swamped by the side lobes of the large target. The expanded view of FIG. 20 still shows only a single discernible main lobe 225 centered at range 50 of the larger target, with the smaller target at range 52 clearly lost.

Figure 21:
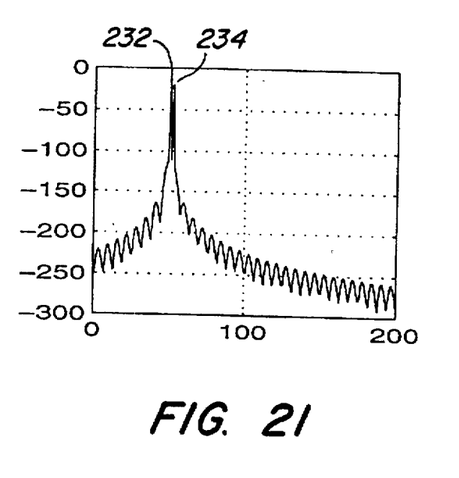
FIG. 21 is the obtained range estimates for the targets of FIG. 17, utilizing the present invention.
Figure 22:
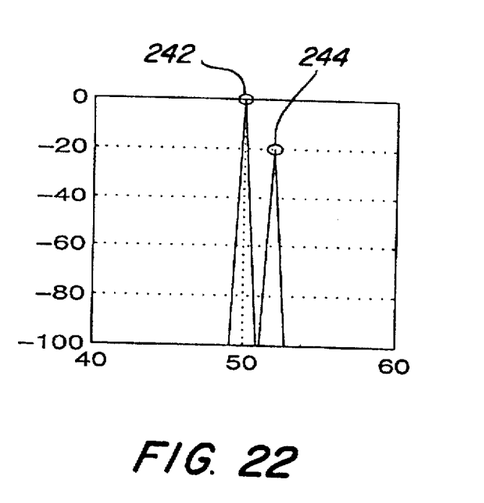
FIG. 22 is the expanded view of FIG. 21.

Referring to FIG. 21, which illustrates the range estimates produced by the MSC filter according to the present invention, a pair of spikes 232 and 234 are discernible with the side lobes considerably depressed. FIG. 22, which is an expanded view of the region of interest in FIG. 21, clearly shows two point targets 242 and 244 at the correct locations and with the correct magnitudes, while the side lobes are lower than -100 dB. The MSC filters of the present invention can help detect targets that were undetectable by prior art pulse compression techniques.

Figure 23:
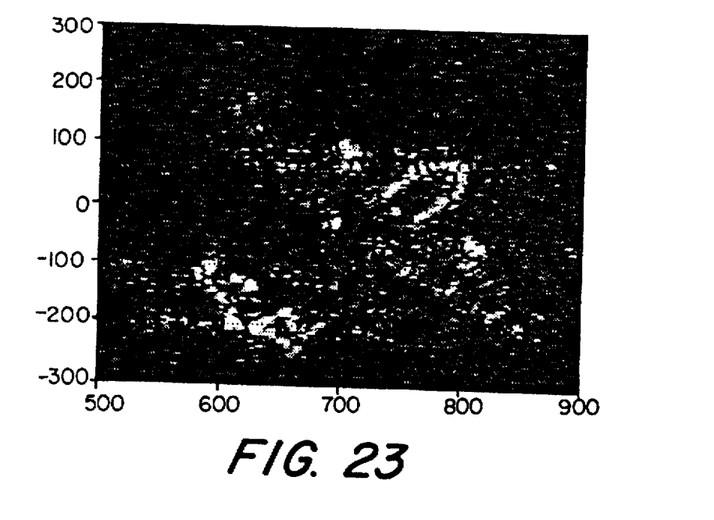
FIG. 23 is a spotlight SAR image of a simulated airplane shape using standard pulse compression techniques.
Figure 24:
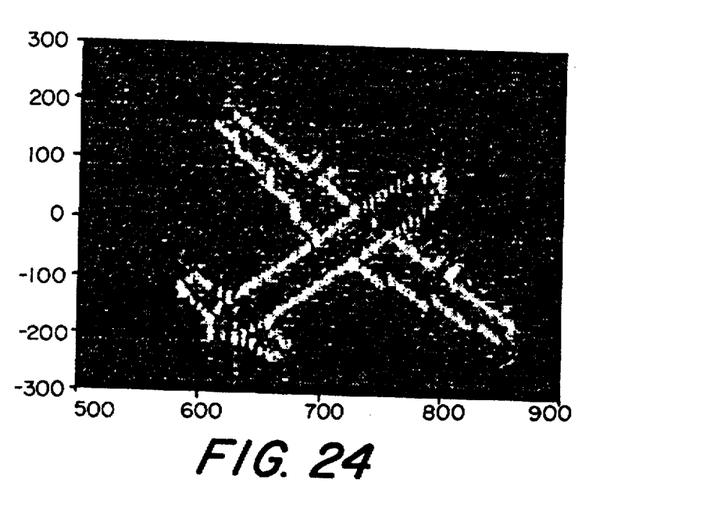
FIG. 24 is the spotlight SAR image of a simulated airplane shape applying the present invention on the same data used for the SAR image reconstruction of FIG. 23.

As illustrative examples of the enhanced resolution obtainable in SAR imagery by the MSC filters of the present invention, reference is made to FIGS. 23 and 24. FIG. 23 shows a reconstructed SAR image from simulated spotlight SAR data of an airplane shape with SNR=-5 dB when the range estimates are obtained through standard pulse compression techniques. FIG. 24 shows the reconstructed SAR image from the same data when the range estimates are obtained by MSC filtering with $\lambda=1$, $\eta=2$. Note that the bandwidth of the linear-FM pulse used in these simulations is 2.5 times smaller than the sampling frequency. The improvement in the resulting SAR image using the MSC filter is clearly evident.

Figure 25:
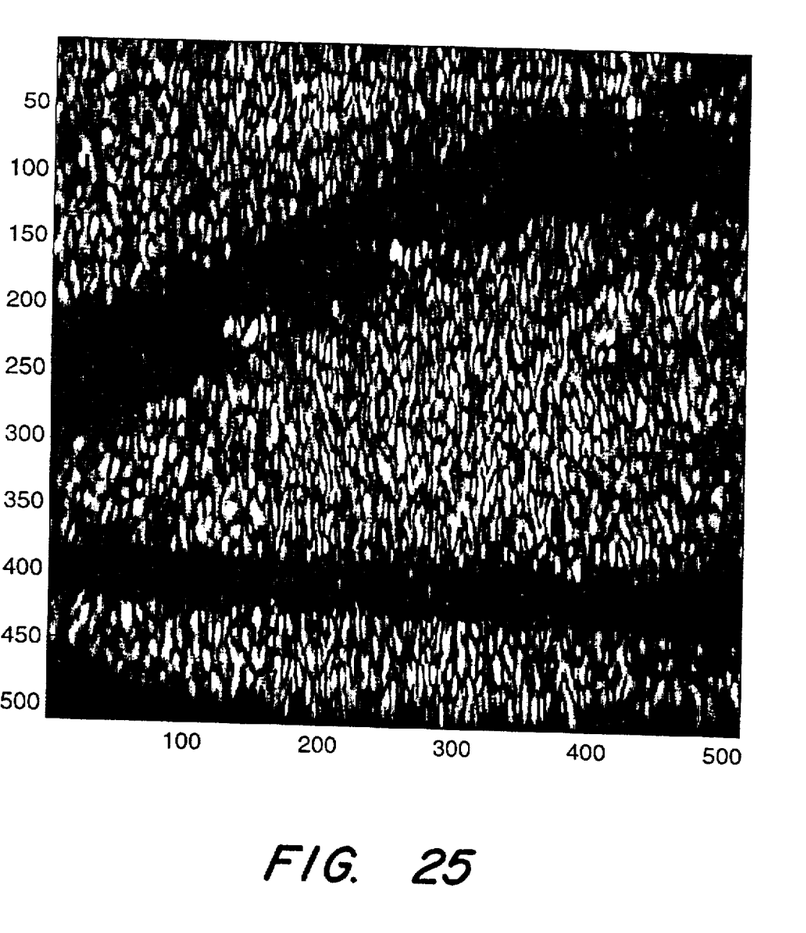
FIG. 25 is the reconstructed SAR image of a section of an airport based on standard SAR pulse compression of real data.
Figure 26:
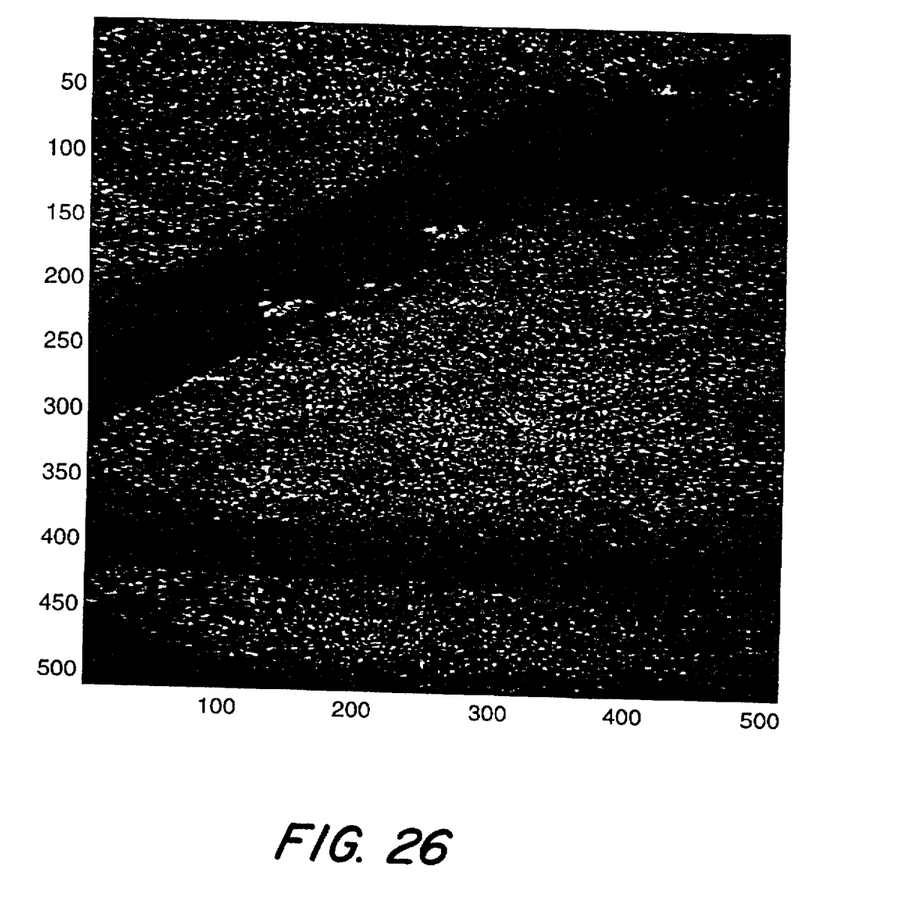
FIG. 26 is the reconstructed SAR image from the same data used for FIG. 25, utilizing the present invention.

As an example of an actual SAR image obtained from real data, FIG. 25 shows the resulting image when the data is processed according to the prior art, and FIG. 26 shows the resulting image using MSC filter processing (with $\lambda=1$ and $\eta=4$) on the same data. The bandwidth of the transmitted pulse waveform was 20% of the sampling frequency in this example. The resultant SAR image of FIG. 26 shows two airplanes parked on a runway. This is not clear from the SAR image of FIG. 25.

Figure 27:
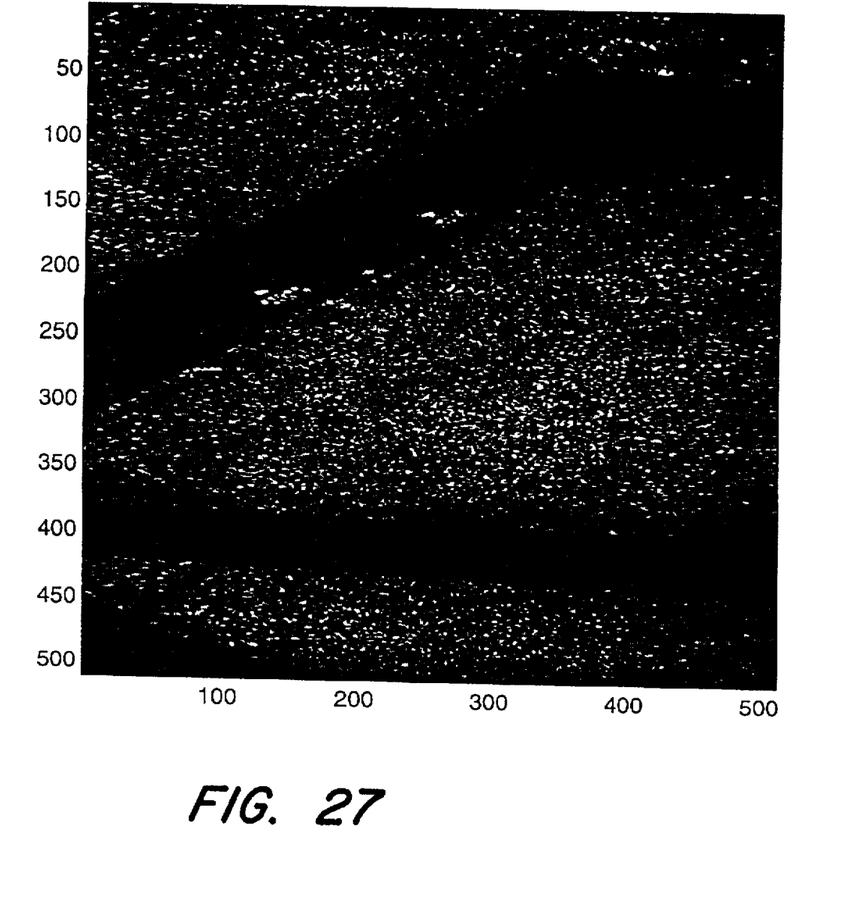
FIG. 27 is the reconstructed SAR image of the same section of the airport as shown in FIG. 25, based on standard SAR pulse compression of real data, obtained with a transmitted pulse having a bandwidth increased by five times.

In order to illustrate the degree of enhanced resolution obtained by the MSC filter of the present invention, the bandwidth of the transmitted pulse waveform was increased by five times, becoming equal to the sampling frequency. The resulting SAR image with the increased pulse bandwidth (by a factor of 5) is shown in FIG. 27. This image is comparable to the result obtained by the MSC filters of the present invention without any increase in bandwidth of the transmitted pulse waveform.

Time-domain implementation of this invention are also possible, instead of the frequency-domain implementation described herein, as a preferred embodiment. Likewise, the described invention can be applied to raw phase history data, prior to pulse compression, by incorporating the latter in the MSC filter as a precascaded component. Although this invention has been described in terms of transmitted pulse signals (wideband, narrowband, or ultra-wideband), its use in a continuous-wave context is also possible, including bistatic systems.

Those skilled in the art will appreciate that various adaptations and modifications of the just described preferred embodiment can be configured without departing from the scope and spirit of the invention. Therefore, it is to be understood that, within the scope of the appended claims, the invention may be practiced other than as specifically described herein.

What is claimed is:

1. In a system for locating reflecting targets wherein signals p(k) are transmitted and reflected signals are received, the reflected signals being processed to estimate range to the reflecting target, an improved signal processing means therein comprising:

first processing means using the transmitted signals p(k) to generate a compensation factor; and second processing means receiving the reflected signals and the compensation factor generated by said first processing means for combining the compensation factor with the reflected signals, to contract the main lobe and suppress the side lobes of the range ambiguity function without changing the bandwidth of the transmitted signals.

2. The improved signal processing means of claim 1 wherein said first signal processing means produces the compensation factor $H(\omega)$ in the time domain.

3. The improved signal processing means of claim 1 wherein said first signal processing means produces the compensation factor $H(\omega)$ in the frequency domain.

4. The improved signal processing means of claim 1 wherein said first signal processing means produces a compensation factor in a domain defined by properly selected bases of functions or sets of waveforms suitable for representing the reflectivity function (sequence) and/or the transmitted/received waveform.

5. A system for generating range data for locating reflecting objects, comprising:

first means for processing signals reflected from an object;

second means for using signals p(k) transmitted to said object to generate a compensation factor $H(\omega)$; and third means for combining the processed reflected signals and the compensation factor $H(\omega)$ to contract the main lobe and suppress the side lobes of the range ambiguity function thereby enhancing resolution of the range data.

6. The range data processing system of claim 5 wherein said first processing means comprises a means for performing a Fast Fourier Transform operation on the pulse compressed reflected data.

7. The range data processing system of claim 6 wherein said second means comprises a bi-parametric filter based on the ratio of high-order signal processing of the transmitted signal with its modified spectral profile.

8. The range data processing system of claim 7 wherein said bi-parametric filter performs high-order signal processing by:

means for raising the transmitted signal to a power $\lambda$;

means for autocorrelating the $\lambda$ raised transmitted signal; and means for raising the autocorrelated signal to a power $\eta$.

9. The range data processing system of claim 7 wherein said bi-parametric filter obtains a modified spectral profile by:

means for adding the stabilizing function $\epsilon(\omega)$ to the Fast Fourier Transform of the autocorrelation of the transmitted signal.

10. The range data processing system of claim 5 wherein said first processing means comprises means for performing pulse compression on the reflected data and a Fast Fourier Transform on the compressed reflected data.

11. A filter for use in processing range data in a system that transmits signals p(k) to reflecting objects and processes signals reflected from such objects, the filter comprising:

first means for processing the transmitted signals p(k) to generate compensation factor $H(\omega)$; and second means for combining the reflected signals and the compensation factor $H(\omega)$ to contract the main lobe and suppress the side lobes of the range ambiguity function without changing the bandwidth of the transmitted signals.

12. The filter of claim 11 wherein said first means comprises:

means for raising p(k) to the power $\lambda$, to produce $p^\lambda(k)$;

means for autocorrelating $p^\lambda(k)$ to produce $q_\lambda(m)$;

means for raising $q_\lambda(m)$ to the power $\eta$, to produce $q^\eta_\lambda(m)$;

means for taking the Fast Fourier Transform of $q^\eta_\lambda(m)$ to produce $HOS^{(\eta\lambda)}(\omega)$;

means for taking the Fast Fourier Transform of the autocorrelated transmitted signal p(k), to produce $|P(\omega)|^2$;

means for generating the stabilizing function $\epsilon(\omega)$ from given $|P(\omega)|^2$, as having nonzero values only when $|P(\omega)|^2$ drops below a given very small value, and then being equal to the difference of this very small value minus $|P(\omega)|^2$; and means for adding the stabilizing function $\epsilon(\omega)$ to $|P(\omega)|^2$ forming the compensation factor:

$$\frac{HOS^{(\eta,\lambda)}(\omega)}{|P(\omega)|^2 + \epsilon(\omega)}.$$

13. The filter of claim 12 wherein the received reflected signals are first compressed in analog or digital form before being supplied to said second means.

14. A method for enhancing the resolution of range estimates for detection and imaging systems wherein signals p(k) are transmitted and other signals are received, the steps of the method comprising:

using the transmitted signals p(k) to generate a compensation factor H($\omega$); and combining the received signals with the generated compensation factor H($\omega$) to contract the main lobe and suppress the side lobes of the range ambiguity function without changing the bandwidth of the transmitted signals.

15. A method for generating data for locating reflecting objects, the steps of the method comprising:

processing signals reflected from an object;

using the signals p(k) transmitted to the reflecting object to generate compensation factor H($\omega$); and combining the processed reflected signals and the generated compensation factor H($\omega$) to contract the main lobe and suppress the side lobes of the range ambiguity function thereby generating range data with high resolution.

16. The method of claim 15 wherein said reflected signal processing step comprises:

pulse compressing the reflected data; and performing a Fast Fourier Transform on the pulse compressed data.

17. The method of claim 15 wherein said compensation factor generation step comprises:

forming a ratio of high-order signal processing of the transmitted signal with its modified spectral profile.

18. The method of claim 17 wherein said ratio forming step comprises:

raising the transmitted signal to a power $\lambda$;

autocorrelating the $\lambda$ raised transmitted signal; and raising the autocorrelated signal to a power $\eta$.

19. The method of claim 17 wherein said ratio forming step comprises:

autocorrelation of the transmitted signals;

taking the Fast Fourier Transform of the autocorrelated transmitted signals; and adding a stabilization function $\epsilon(\omega)$ to the Fast Fourier Transform.

20. A method for processing range data in a system that transmits signals to reflecting objects and processes the signals reflected from the objects, the steps of the method comprising:

processing the transmitted signals p(k) to generate a compensation factor H($\omega$); and combining the reflected signals and the compensation factor H($\omega$) to contract the main lobe and suppress the side lobes of the range ambiguity function without changing the bandwidth of the transmitted signals.

21. The method of claim 20 wherein said compensation factor generating step comprises:

raising the transmitted signal p(k) to the power $\lambda$, to produce $p^\lambda(k)$;

autocorrelating $p^\lambda(k)$ to produce $q_\lambda(m)$;

raising $q_\lambda(m)$ to the power $\eta$, to produce $q^\eta_\lambda(m)$;

taking the Fast Fourier Transform of $q^\eta_\lambda(m)$ to produce $HOS^{(\eta,\lambda)}(\omega)$;

autocorrelating the transmitted signal p(k);

taking the Fast Fourier Transform of the autocorrelated transmitted signal, to produce $|P(\omega)|^2$;

generating a stability function, $\epsilon(\omega)$;

adding the stability function, $\epsilon(\omega)$ to $|P(\omega)|^2$; and forming a compensation factor:

$$\frac{HOS^{(\eta,\lambda)}(\omega)}{|P(\omega)|^2 + \epsilon(\omega)}.$$

* * * * *